United States Patent
Macall

(10) Patent No.: US 9,519,117 B2
(45) Date of Patent: Dec. 13, 2016

(54) OPTICAL FIBER TRACK SYSTEM AND METHOD FOR USING THEREOF

(75) Inventor: Thomas George Macall, San Jose, CA (US)

(73) Assignee: Infinera Corporation, Sunnyvale, CA (US)

(*) Notice: Subject to any disclaimer, the term of this patent is extended or adjusted under 35 U.S.C. 154(b) by 798 days.

(21) Appl. No.: 13/441,362

(22) Filed: Apr. 6, 2012

(65) Prior Publication Data

US 2013/0266265 A1 Oct. 10, 2013

(51) Int. Cl.
G02B 6/36 (2006.01)
G02B 6/43 (2006.01)
G02B 6/44 (2006.01)

(52) U.S. Cl.
CPC ............... *G02B 6/43* (2013.01); *G02B 6/4459* (2013.01); *Y10T 29/49826* (2015.01)

(58) Field of Classification Search
None
See application file for complete search history.

(56) References Cited

U.S. PATENT DOCUMENTS

| 7,331,722 B2* | 2/2008 | Tan ................................. 385/92 |
| 8,346,043 B2* | 1/2013 | Baum et al. .................. 385/135 |
| 2011/0026895 A1* | 2/2011 | Baum et al. .................. 385/135 |

* cited by examiner

*Primary Examiner* — Tina Wong
(74) *Attorney, Agent, or Firm* — Dunlap Codding PC; David L. Soltz

(57) ABSTRACT

A track system comprises a track having a first end, a second end, and defining one or more first channels extending from the first to the second end of the track for accommodating one or more optical fibers therein. The track is attachable to a support and defines a first plane. The track system also comprises a ramp having a first end, a second end, and defining one or more second channels extending from the first end of the ramp to the second end of the ramp for accommodating the one or more optical fibers therein. The ramp is attachable to the support such that the first end of the ramp is adjacent to the second end of the track, the one or more first channels is aligned with the one or more second channels, and the second end of the ramp extends in a second plane.

15 Claims, 8 Drawing Sheets

OPTICAL FIBER TRACK SYSTEM AND METHOD FOR USING THEREOF

BACKGROUND

1. Field of the Inventive Concepts

The inventive concepts disclosed herein generally relate to optical fibers, and more particularly, but not by way of limitation, to an optical fiber track system and to methods of using thereof.

2. Brief Description of Related Art

Optical fibers are flexible transparent fibers made of pure glass about as thick as a human hair. Recently, some plastic materials have also been used for manufacturing optical fibers, but plastics are generally less optically uniform than pure glass. This typically limits the use of currently available plastic optical fibers for short distances where the associated signal attenuation does not pose a significant problem. Optical fibers function as optical pipes, or waveguides, allowing a light beam to propagate along the optical fiber due to a phenomenon known as total internal reflection.

Total internal reflection is achieved when a light beam encounters a boundary between two materials with different refractive indexes at an angle lower than a certain angle referred to as the critical angle of incidence. The difference in refractive indexes and the critical angle of incidence prevent the light from leaking out of the fiber and cause it to reflect and propagate along the optical fiber instead. To achieve the needed difference in refractive indexes, optical fibers are typically cladded in one or more layers of materials having a desired refractive index different from the refractive index of the optical fiber. To ensure that the critical angle of incidence is not exceeded, optical fibers have a minimum bend radius, and bending the optical fiber beyond this minimum bend radius may cause signal degradation due to light leaking out of the optical fiber and/or physical or mechanical optical fiber damage.

Optical fibers may be bundled, braided, or otherwise grouped into optical fiber cables, which have found widespread use in the telecommunication and computing industries. One or more layers of opaque materials may be deposited onto individual optical fibers in an optical fiber cable to prevent light leaking out of one optical fiber from interfering with light travelling through adjacent optical fibers. Additionally, one or more layers of protective materials may be used to protect the optical fibers and the optical fiber cable from external light and damage due to environmental conditions such as moisture, abrasive particles, vibration, and the like.

Recent developments in opto-electrical devices have allowed the use of optical fibers in data networks by combining optical fibers and printed circuit boards. Typically, an opto-electrical module is used to convert electrical signals into optical signals, the optical signals are transferred via one or more optical fibers, and another opto-electrical module is used to convert the optical signals back into electrical signals at their destination. This technology has allowed significant increases of available network bandwidth and has resulted in transmitting data literally at the speed of light.

Printed circuit boards are currently used in a variety of electrical and opto-electrical devices, and generally have small sizes to allow for the reduction of size and weight of various devices. Optical fibers can be attached to a variety of printed circuit boards in order to interface with optical and electrical components, such as opto-electrical modules, optical fiber trays, optical splicers, and optical splitters, for example.

Due to the fixed length of optical fibers and the small size of printed circuit boards used in modern electronics, optical fibers frequently have to be routed, or looped, around a circuit board several times, while at the same time not being bent beyond their minimum bend radius.

Existing methods to secure optical fibers to printed circuit boards rely on optical fiber clips, optical fiber ties, optical fiber posts, or optical fiber trays. Such optical fiber clips, ties, and trays, however, result in inconsistent routing of the optical fibers, and do not protect the optical fibers from damage during device assembly and subsequent use.

During device assembly, the optical fibers are generally routed by hand through the use of clips, ties, or optical fiber trays. This may result in some optical fibers being bent beyond their minimum bend radius. Further, exposed optical fibers may be damaged or broken during subsequent device assembly steps due to their completely unprotected state. The proper installation and routing of optical fibers in the prior art largely depends on the skill of the installer, and as such may be inconsistent, expensive, and time-consuming.

Another problem posed by the constantly decreasing size of printed circuit boards is the lack of space to attach the clips, ties, or optical fiber trays routing the optical fibers. The designer of a printed circuit board typically takes into account the needed optical fiber attachments sites, and designs the various connections in the circuit board around the needed attachments sites. Typically, no electrical components may be mounted directly under the path of the optical fibers across the surface of the printed circuit board. Due to the limited space available on the printed circuit board, and the necessary coordination between several acceptable attachment sites as dictated by the minimum bend radius, the current procedure for attaching optical fibers to printed circuit boards is unsatisfactory and complicates the design process for printed circuit boards.

The clips, ties, and trays currently employed to route optical fibers across printed circuit boards control the routing of only a relatively small portion of the optical fibers, and large spans of optical fiber are left uncontrolled. As a result, optical fibers may shift, slip, or move during shipping, handling, and use of the device. Such optical fiber movement may lead to optical fiber damage and result in signal loss or attenuation. Further, large portions of optical fiber are left completely unprotected and susceptible to damage during device assembly, shipping, handling, and use.

Further, because some opto-electrical components are mounted at different elevations relative to a plane defined by the printed circuit board, the bend radius and the position of the optical fibers should be reliably and accurately controlled not only in a single plane, but in all three dimensions. Clips, ties, and optical trays currently available are generally inadequate to accurately control the routing of optical fibers in the plane of the printed circuit board, and even more inadequate to route fibers above or below the plane of the printed circuit board. Repeatability in routing of optical fiber is difficult to achieve using traditional fiber clips, ties, and trays, as well.

To this end, a need exists for an optical fiber track system and method for routing optical fibers using the same. It is to such an optical fiber track system and method for routing optical fibers that the inventive concepts disclosed herein are directed.

SUMMARY

In one embodiment, the present disclosure describes an optical fiber track system having a track and a ramp.

In this embodiment, the track has a first end, a second end, one or more first channels extending from the first end of the track to the second end of the track, the one or more first channels for accommodating the one or more optical fibers therein. The track defines a first plane and is attachable to a support. The ramp has a first end, a second end, and defines one or more second channels extending from the first end of the ramp to the second end of the ramp, the one or more second channels for accommodating the one or more optical fibers therein. The ramp is attachable to the support such that the first end of the ramp is adjacent to the second end of the track. When the track and the ramp are attached to the support, the one or more first channels is substantially aligned with the one or more second channels, and the second end of the ramp extends in a second plane.

In various embodiments, the first plane and the second plane may be non-coplanar.

The optical fiber track system may include a track cover attachable to the track, such that the track cover substantially covers the one or more first channels. Optionally, the track cover further comprises an end extending a first distance past the second end of the track. As yet another option, the optical fiber track system may include a ramp cover attachable to the ramp, such that the ramp cover substantially covers the one or more second channels. The ramp cover may have an end extending a second distance past the second end of the ramp.

The support may be a printed circuit board.

In another embodiment, the present disclosure describes a method. In the method, one or more optical fibers is routed through an optical fiber track system having a track as described above.

In yet another embodiment, the present disclosure describes a kit for routing an optical fiber. The kit includes a track, a track cover, and a ramp cover.

The track may comprise a first end, a second end, and may define one or more first channels extending from the first end of the track to the second end of the track, the one or more first channels for accommodating one or more optical fibers therein. The track may be attachable to a support and may define a first plane.

The ramp may be provided with a first end, a second end, and may define one or more second channels extending from the first end of the ramp to the second end of the ramp, the one or more second channels for accommodating the one or more optical fibers therein. The ramp may be attachable to the support such that the first end of the ramp is adjacent to the second end of the track.

When the track and the ramp are attached to the support, the one or more first channels may be substantially aligned with the one or more second channels, and the second end of the ramp may extend in a second plane.

The track cover may be attachable to the track, such that the track cover substantially covers the one or more first channels. The ramp cover may be attachable to the ramp, such that the ramp cover substantially covers the one or more second channels.

In yet another embodiment, the present disclosure describes an optical fiber track system provided with a track and one or more truss. The track has a first end, a second end, and defines one or more first channel extending from the first end of the track to the second end of the track, the one or more first channel for accommodating one or more optical fibers therein. The track may be attachable to a support defining a first plane.

The truss may extend from the track. The truss has a first end positioned adjacent to the track, and one or more connectors spaced a distance of at least about ¼ inch away from the first end of the truss. The one or more connectors may be configured to attach the truss to the support.

When the track is attached to the support, one or more electrical components may be at least partially positioned between the track and the support.

The truss may be formed as a unitary body with the track, and may also include two or more arms extending from the first end of the truss to the one or more connector.

BRIEF DESCRIPTION OF THE DRAWINGS

The following detailed description of various embodiments of the inventive concepts disclosed herein will be better understood when read in conjunction with the appended drawings. For the purposes of illustrating the systems, devices, and components of the inventive concepts disclosed herein, exemplary embodiments are shown in the drawings. It should be understood, however, that the inventive concepts disclosed herein are not limited to the precise arrangement, structures, features, embodiments, aspects, and instrumentalities shown, and the arrangements, structures, features, embodiments, aspects, and instrumentalities shown may be used singularly or in combination with other arrangements, structures, features, embodiments, aspects, and instrumentalities. In the drawings.

DETAILED DESCRIPTION

Figure 1:
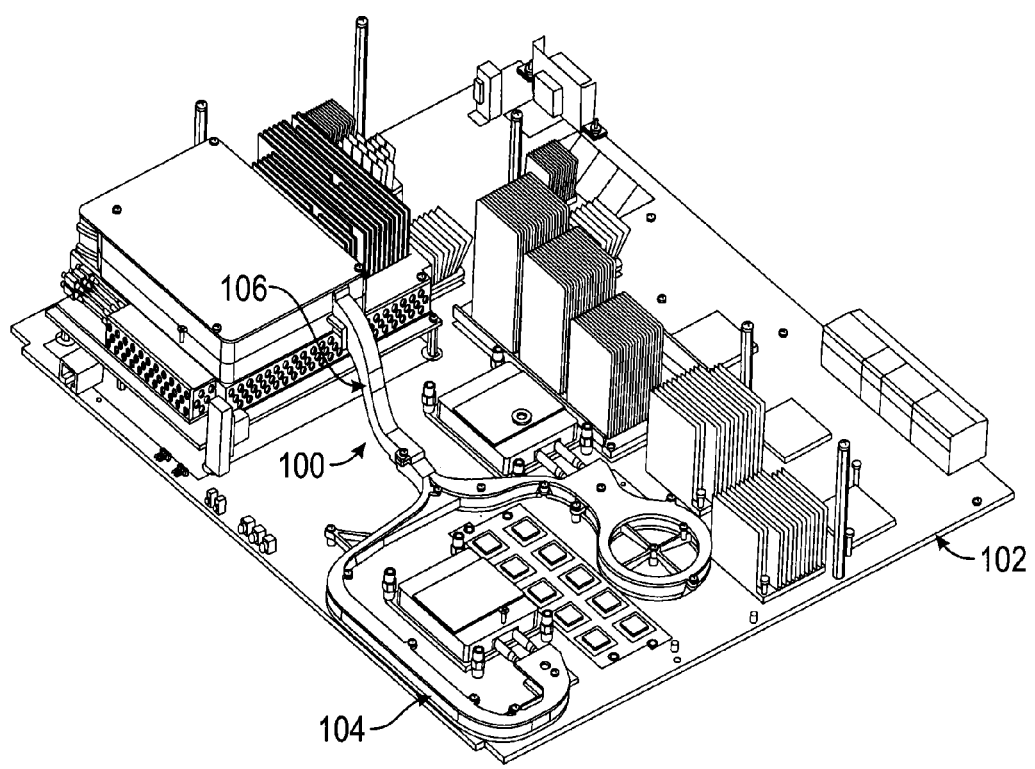
FIG. 1 is a perspective view of an optical fiber track system according to the inventive concepts disclosed herein shown mounted on a support.

Before explaining at least one embodiment of the inventive concepts in detail, it is to be understood that the inventive concepts disclosed herein are not limited in their application to the details of construction, experiments, exemplary data, and/or the arrangement of the components as set forth in the following description or illustrated in the drawings. The inventive concepts disclosed herein are capable of other embodiments or of being practiced or carried out in various ways. Also, it is to be understood that the phraseology and terminology employed herein is for purpose of description and convenience and should not be regarded as limiting.

Certain embodiments of the inventive concepts will now be discussed with reference to the aforementioned figures, wherein like reference numerals refer to like components. In certain of the figures, not all of the elements may be numerically referenced, where the identity of such an element is clearly evident in reference to said element identified elsewhere in the same or another figure.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The inventive concepts disclosed herein provide at least partial, but desirably substantially complete routing of delicate optical fibers from opto-electrical component to opto-electrical component, providing protection for the optical fiber from forced air currents, user handling, and moderate shock and vibration. An optical fiber track system designed according to the inventive concepts disclosed herein provides protection to the optical fiber and provides repeatability of the routing of optical fibers. Optical fiber bend radius is accurately controlled through the substantially entire process of routing the optical fibers.

Referring now to FIG. 1, shown therein is an exemplary embodiment of an optical fiber track system 100 according to the inventive concepts disclosed herein, shown attached to a support 102. The optical fiber track system 100 comprises a track 104, and a ramp 106. It is to be understood, however, that in some exemplary embodiments of the inventive concepts disclosed herein, the track 104 and the ramp 106 may be formed as a unitary body. Further, in some exemplary embodiments the track 104 or the ramp 106 may be omitted.

Further, while the support 102 is shown as being a printed circuit board, the inventive concepts disclosed herein are not limited to using a printed circuit board, as will be understood by persons of ordinary skill in the art having the benefit of the instant disclosure.

Figure 2:
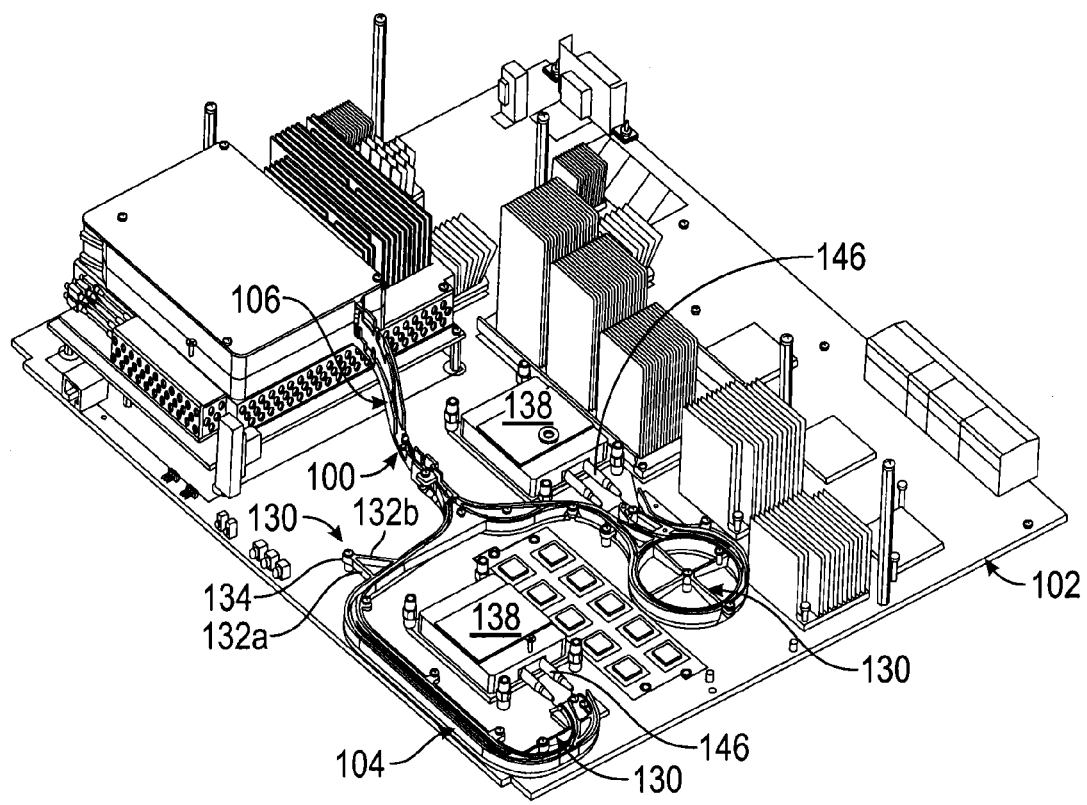
FIG. 2 is another perspective view of the optical fiber track system of FIG. 1 with a track cover and a ramp cover removed.
Figure 3:
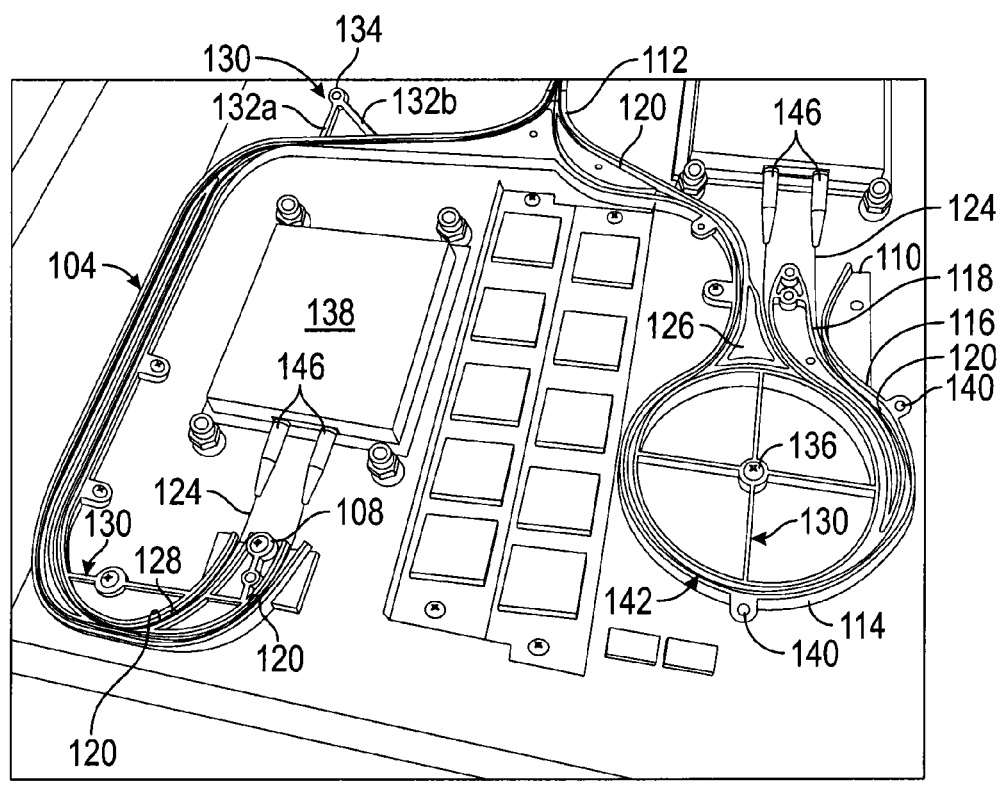
FIG. 3 is a perspective view of a track of the optical fiber track system of FIG. 1, shown with the track cover removed for clarity.

Referring now to FIGS. 2-4B, the track 104 may have a first end 108 (FIG. 3), a second end 110 (FIG. 3), a ramp end 112 (FIG. 3), a bottom 114 (FIG. 3), one or more first wall 116 and one or more second wall 118 extending from the bottom 114 such that one or more optical fiber channels 120 is defined by the bottom 114, the one or more first wall 116 and the one or more second wall 118 of the track 104. For example, the track 104 may define two or more optical fiber channels 120 as shown in FIG. 3. The one or more optical fiber channels 120 can extend between the first end 108 of the track 104 and the ramp end 112 of the track 104, and/or from the second end 110 of the track 104 to the ramp end 112 of the track 104, for example. The track 104 may further have a track cover 122, as will be described with reference to FIG. 5 below.

The track 104 may have any desired shape, size, and curvature, provided that that the curvature of the one or more optical fiber channels 120 is at least equal to or greater than the minimum bend radius of one or more optical fibers 124 accommodated by the one or more optical fiber channels 120. For example, one or more first portions of the track 104 may be straight, and one or more second portions of the track 104 may be curved, S-shaped, oval, circular, U-shaped, or shaped in any other desired manner. In some exemplary embodiments, the track 104 may be straight, curved, S-shaped, U-shaped, oval, circular, serpentine, elliptical, and combinations thereof, for example.

Desirably, the first end 108 of the track 104 is substantially straight for a distance of about ½ inch, for example, but in some exemplary embodiments the distance may be less than about ½ inch, or more than about ½ inch, as will be understood by persons of ordinary skill in the art having the benefit of the instant disclosure.

The second end 110 of the track 104 may likewise be substantially straight for any desired distance, such as about ½ inch, for example.

Similarly, the ramp end 112 of the track 104 may be substantially straight for a distance of about ½ inch, for example. It is to be understood, however, that in some exemplary embodiments of the inventive concepts disclosed therein, the first end 108 of the track 104, the second end 110 of the track 104, and/or the ramp end 112 of the track 104 may have various curvatures, provided such curvatures are at least equal to, or exceed the minimum bend radius of the one or more optical fibers 124.

To permit insertion of the one or more optical fibers 124 in the one or more optical fiber channels 120, the one or more optical fiber channels 120 has an open top and is adapted to accommodate and selectively retain the one or more optical fibers 124 therein. The one or more optical fiber channels 120 generally follows the curvature of the track 104, but it is to be understood that one or more portions of the one or more optical fiber channels 120 may deviate from the general curvature of the track 104 in some exemplary embodiments. The one or more optical fiber channels 120 may comprise optical fiber retaining features, such as tabs 126, protrusions 128, spacers (not shown), dividers (not shown), clips (not shown), brackets (not shown), and combinations thereof, for example. The tabs 126 and protrusions 128 may function to center, retain, and/or separate the one or more optical fibers 124 positioned inside the one or more optical fiber channels 120, for example.

It is to be understood that one, two, three, or more than three optical fiber channels 120 may be implemented with the inventive concepts disclosed herein, and one, two, three, or a plurality of optical fibers 124, may be accommodated by the one or more optical fiber channels 120, for example. The one or more optical fiber channels 120 may be lined with one or more materials, such as opaque light-shielding materials, elastomeric cushioning materials, moisture-absorbing materials, vibration-absorbing materials, shock-reducing materials, and combinations thereof, which may be implemented to protect the one or more optical fibers 124 from heat, light cross-leakage, moderate vibrations, moisture, shocks due to dropping the device, and combinations thereof, for example.

The track 104 may further comprise one or more truss 130 (FIGS. 2-4B) extending from the track 104 and having one or more arms 132a-n and one or more connector 134. The one or more truss 130 is adapted to attach the track 104 to the support 102 via the one or more connector 134 positioned at a distance from the track 104 (e.g. about ¼ inch), such as by using one or more screws 136, bolts (not shown), welds (not shown), adhesives (not shown), and combinations thereof, for example. It is to be understood that in some exemplary embodiments the one or more truss 130 may be press-fitted, inserted into notches or openings (not shown), attached to brackets (not shown), glued, welded, or otherwise secured to the support 102 via the one or more connector 134.

Figure 4A:
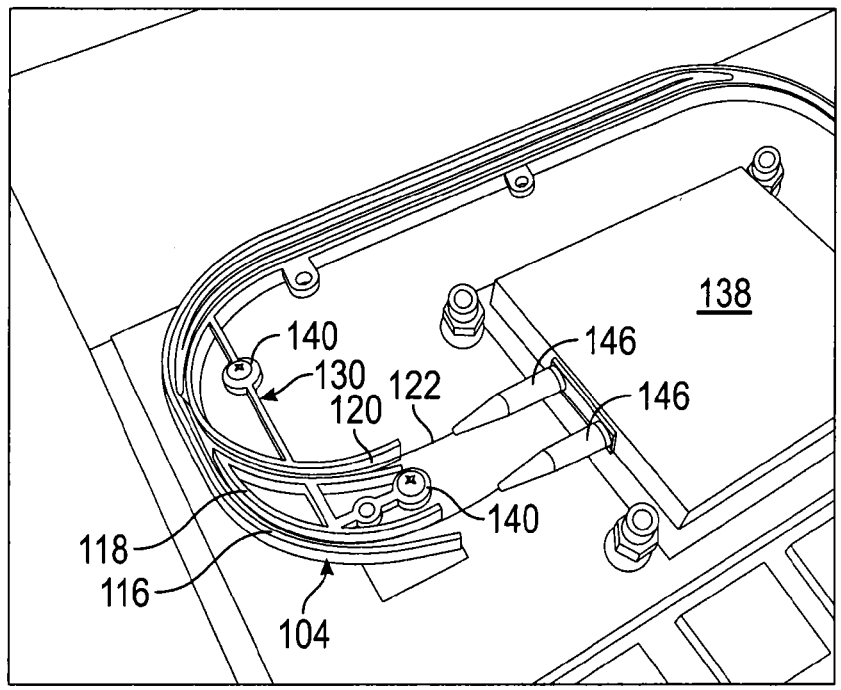
FIG. 4A is a perspective view of a first end of the track of FIG. 3.
Figure 4B:
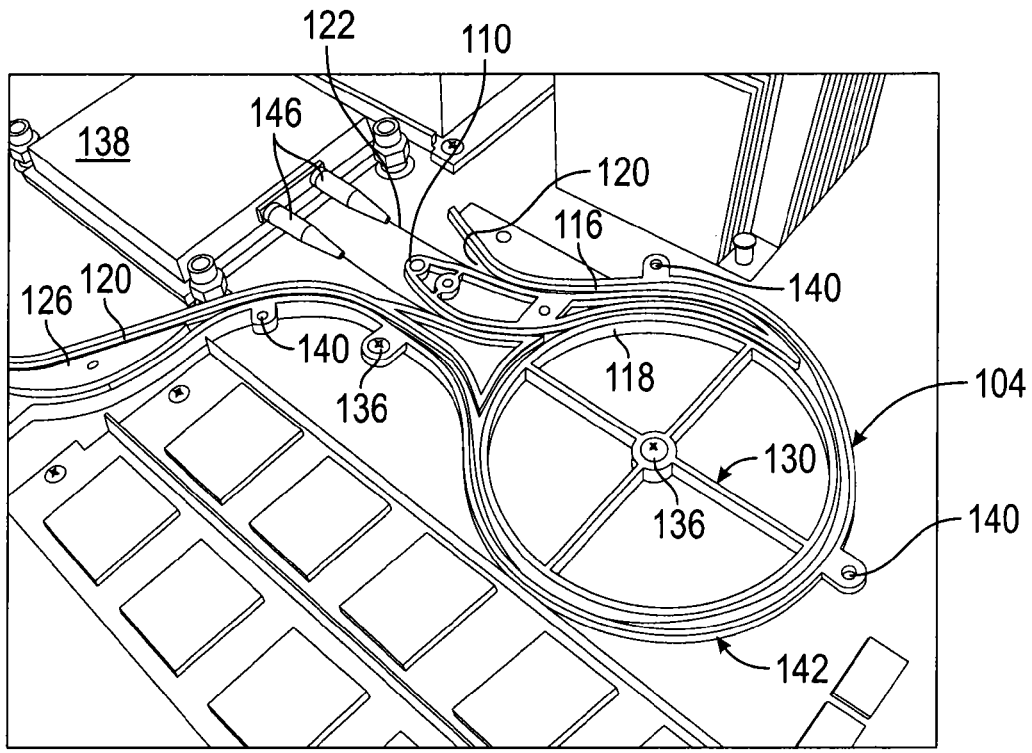
FIG. 4B is a perspective view of a second end of the track of FIG. 3.

It is to be also understood that while the one or more truss 130 is shown in FIG. 2 as extending laterally from the track 104 and being substantially A-shaped with two arms 132a and 132b, the one or more truss 130 may have any desired shape, size, orientation, and any number of arms 132a-n, depending on support 102 design, operating variables, materials used, and combinations thereof, for example. For example, the one or more truss 130 may extend between a first portion of the track 104 and a second portion of the track 104 and the connector 134 may be positioned between the first portion of the track 104 and the second portion of the track 104 as shown in FIGS. 3 and 4A. In some exemplary embodiments, the one or more truss may be substantially surrounded by a portion of the track 104, as shown in FIGS. 3 and 4B, and may comprise one, two, three, four, or more than four arms 132a-n.

Further, while the one or more truss 130 is shown as extending from the track 104, in some exemplary embodiments the one or more truss 130 may be attached to the track 104 and to the support 102 in any conventional manner, such as screws, bolts, clamps, adhesives, and combinations thereof, for example. In some exemplary embodiments, the one or more truss 130 may be slidable, extendable, retractable, rotatable, pivotable, or otherwise adjustable relative to the track 104, such that the connector 134 may be selectively moved between a first position and a second position relative to the track 104.

It is to be understood that the one or more truss 130 may extend laterally, horizontally, or vertically from the track 104, and may be oriented at any desirable angle relative to the track 104, which angle may vary from 0 to 180 degrees, such that the one or more connector 134 is spaced at a distance from the track 104, for example. In some exemplary embodiments, a first connector 134 may be spaced at a first distance from the track 104, and a second connector 134 may be spaced at a second distance from the track 104, and the first and second distance may be different, similar, or substantially equal to one another. Further, the one or more truss 130 may be straight, curved, or may have one or more arms 132a-n having one or more straight portions, and one or more curved portions, and combinations thereof in some exemplary embodiments.

The one or more truss 130 may function to support the track 104 a distance above the support 102, such that the track 104 is oriented at an angle relative to a plane of the support 102, which angle may vary from 0° to about 90°, for example. Further, the one or more truss 130 may function to position the one or more connector 134 at a distance from the track 104, which distance may vary from about 0.1 inch to any desired distance, preferably about ¼ inch or larger, for example. This desirably allows the track 104 to be supported above the support 102 without interfering with other functionality of the support 102. For example, in one embodiment the support 102 is a circuit board that has at least two functions: 1) routing signals and supporting components, and 2) supporting the track 104. In this embodiment, the one or more connector 134 is designed to connect the track 104 to the support 102 without interfering with the other signal routing or components of the support 102. One or more electrical component 138 may be at least partially positioned between the track 104 and the support 102. Further, the one or more truss 130 may allow for optimal selection of the attachments sites for the one or more connector 134, such that the attachment sites for the one or more connector 134 do not interfere with the electrical components, circuits, or traces of the support 102, for example.

As used herein, the term attachment site (or attachment sites) refers to an area of the support 102 that is devoid of electrical components 138, traces, circuits, and other devices that could be interfered with by the optical fiber track system 100, for example. It is to be understood, however, that an attachment site may be incorporated into one or more electrical or opto-electrical components attached to the support 102 in some exemplary embodiments of the inventive concepts disclosed herein.

The track 104 may further define one or more attachment openings 140 adapted to receive one or more screws 136 therein, such that the track 104 may be securely attached to the support 102, either directly or at a distance above the support 102, for example. It is to be understood that the one or more truss 130, attachment openings 140, or a combination of one or more truss 130, attachment openings 140, and/or other attachment mechanisms (not shown) such as brackets, flanges, posts, and columns, and combinations thereof may be used with the inventive concepts disclosed herein. Further, one or more heat sinks, vibration-reducing pads, rubberized inserts, and combinations thereof may be implemented in any conventional manner to protect the track 104 from heat and/or vibrations as will be appreciated by a person of ordinary skill in the art.

Further, a portion 142 of the track 104 may be implemented, such that any excess length of the one or more optical fibers 124 may be looped, or wound, around the portion 142 one or more times as necessary to accommodate any excess length of the one or more optical fibers 124 onto the support 102, for example. The portion 142 may be connected to the support via one or more truss 130 in some exemplary embodiments.

The track 104 may be constructed of any suitable material, such as plastics, resins, laminates, wood, non-metals, metals, polymers, rubbers, and combinations thereof, for example. The track 104 may be made using any conventional method, such as molding, casting, machining, carving, pouring, fabricating, 3D printing, and combinations thereof, for example. In some embodiments, the track 104 may be formed of the same or similar materials with the support 102, for example. In other embodiments, the track 104 and the support 102 may be formed as a unitary body, for example.

Figure 5:
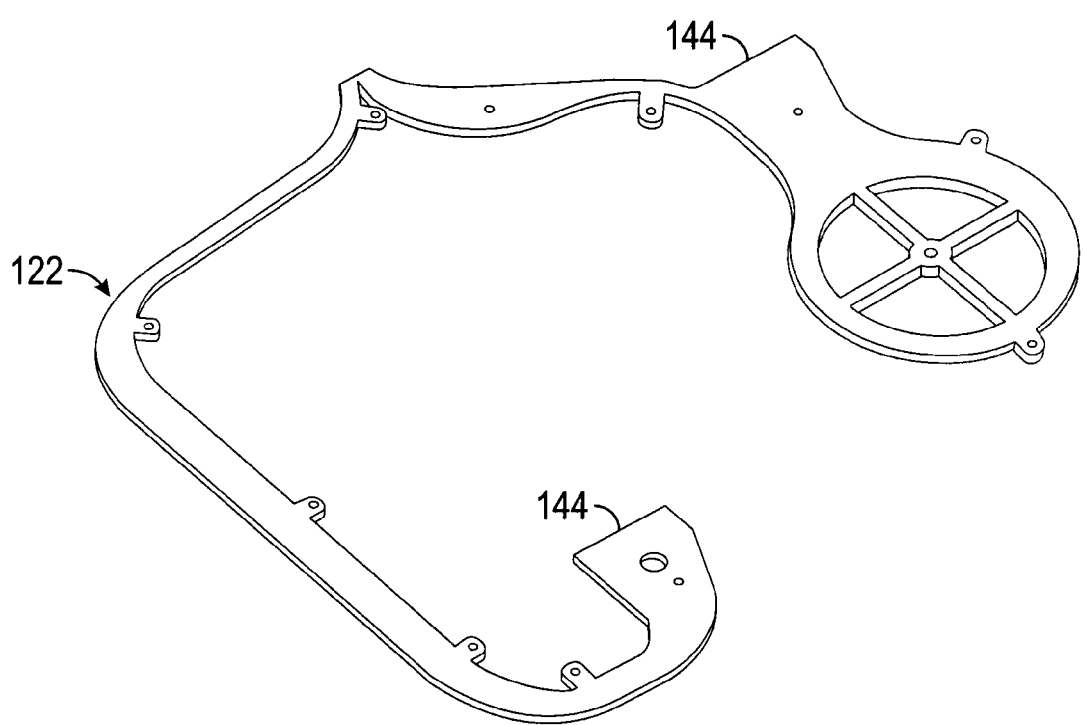
FIG. 5 is a top plan view of a track cover according to the inventive concepts disclosed herein.

Referring now to FIG. 5, the optional track cover 122 may be substantially flat and may be adapted to correspond to the shape and size of the track 104. The track cover 122 may be constructed of any suitable material, such as plastics, resins, laminates, thermoplastics, rubber, metals, non-metals, fibrous materials, textiles, fabrics, glass, and combinations thereof, for example. The track cover 122 may be attached to the track 104 in any conventional manner, such as via press-fitting, tabs, ties, brackets, bolts, clamps, plastic ties, wire, screws, adhesives, ultrasonic welds, joints, and combinations thereof, for example.

The track cover 122 desirably functions to provide at least partial, and preferably substantially complete protection for the one or more optical fibers 124 by substantially completely covering the one or more optical fiber channels 120, such as by fitting over the first wall 116 and the second wall 118. One or more end 144 of the track cover 122 may overhang or extend past the first end 108 and/or the second end 110 of the track 104, and over the one or more optical fibers 124, for a distance such that the one or more optical fibers 124 is protected as it extends between the track 104 and the respective opto-electrical component 138 to which the one or more optical fibers 124 is connected via a connector 146 (FIGS. 2-4B). In some embodiments, the one or more end 144 may extend past the first end 108 of the track 104 and/or the second end 110 of the track 104 to at least partially overlap the connector 146, such that the one or more optical fibers 124 is substantially completely covered by the track cover 122, for example. The connector 146 may be any conventional connector 146 as will be understood by a person of ordinary skill in the art.

The track cover 122 may be lined with one or more layers of material (not shown), such as an elastomeric material, to further protect the one or more optical fibers 124 from vibration, light, external contaminants such as dust or debris, and damage, for example.

Figure 6:
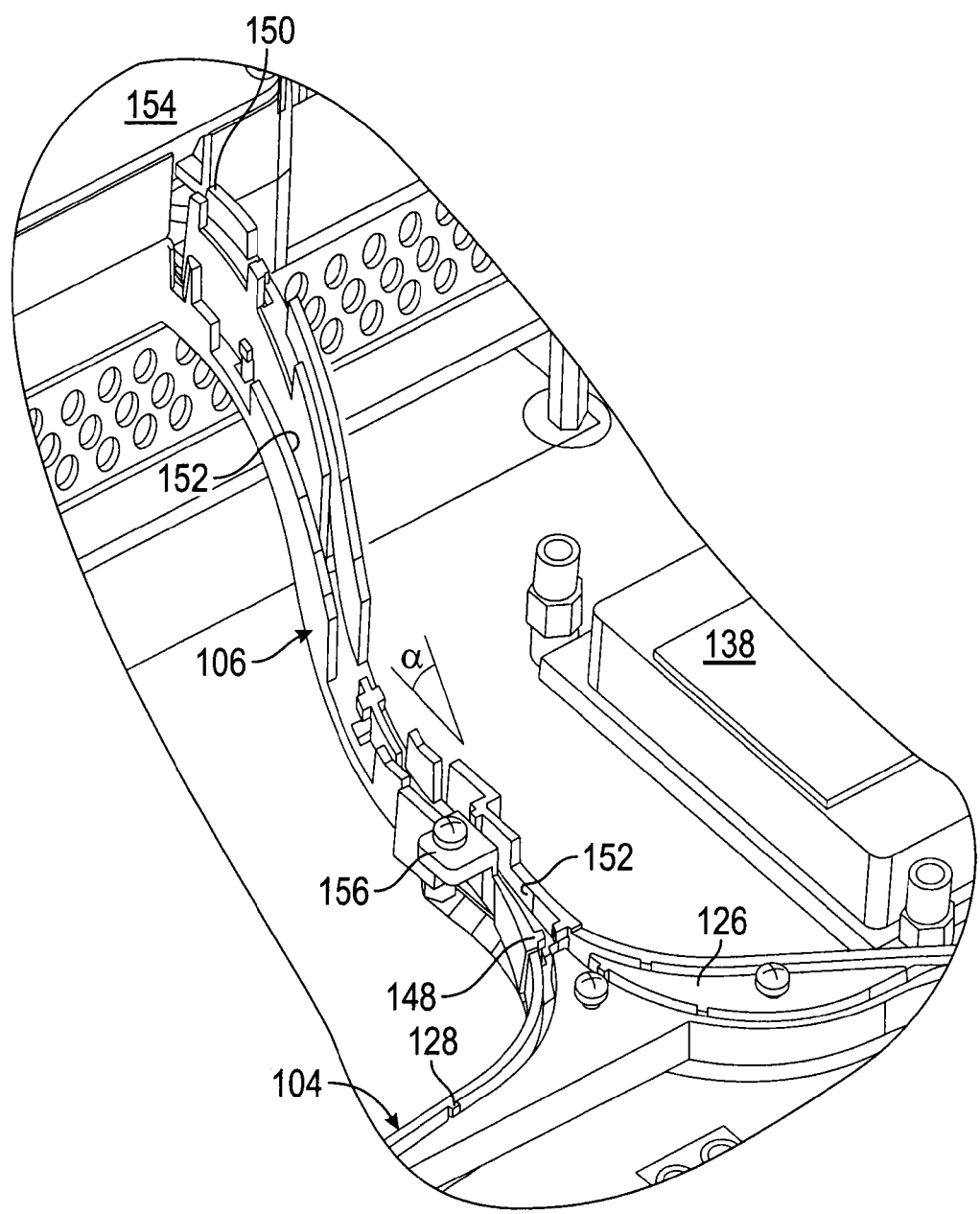
FIG. 6 is a perspective view of a ramp of the optical fiber track system of FIG. 1.
Figure 7:
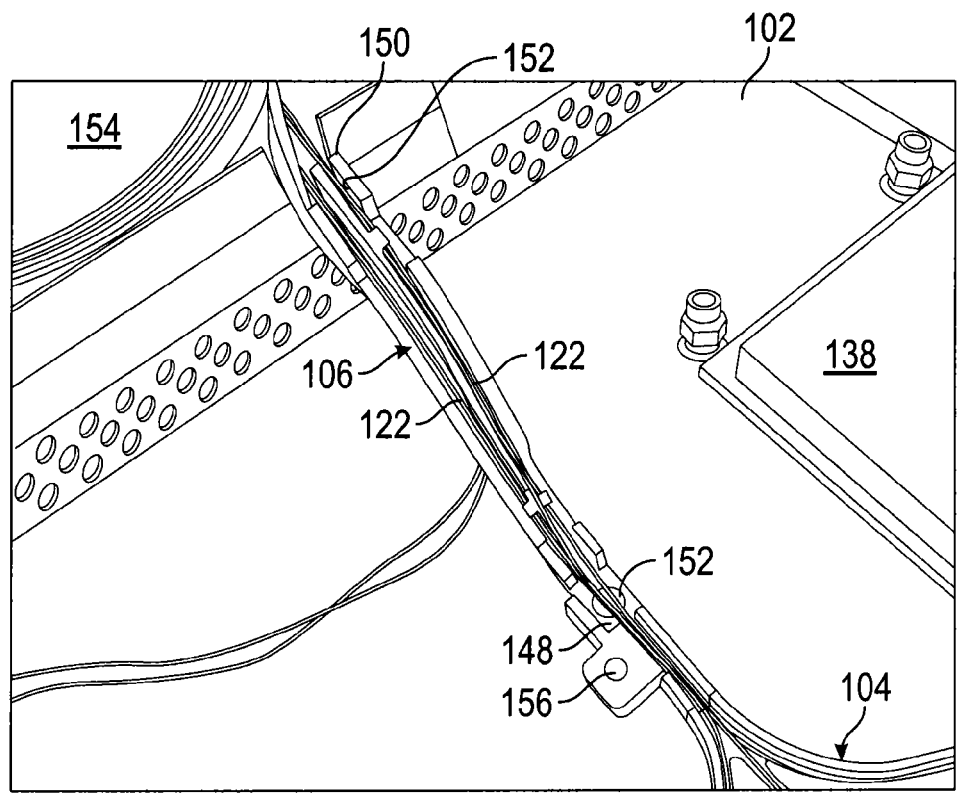
FIG. 7 is a perspective view of the ramp of FIG. 6, with the ramp cover removed and two optical fibers accommodated therein.

Referring now to FIGS. 6 and 7, the ramp 106 may be implemented similarly to the track 104, and has a first end 148, a second end 150, and one or more channels 152 extending between the first end 148 and the second end 150 at an angle α relative to a plane defined by the track 104. The angle α may be any desired angle, such as between about 0°-90°, provided that the one or more optical fibers 124 is not bent beyond its minimum bend radius. For example, the angle α may vary gradually, rapidly, randomly, and combinations thereof, along the length of the one or more channels 152, provided that the one or more optical fibers 124 is not bent beyond its minimum bend radius.

The ramp 106 functions to accommodate and protect the one or more optical fibers 124 in three-dimensions, such that the one or more optical fibers 124 is conveyed to an opto-electrical component 154 positioned in a plane that is non-coplanar with the plane defined by the track 104 when the first end 148 of the ramp 106 is connected to, or positioned adjacent to the ramp end 112 of the track 104.

Non-coplanar is intended to include two or more planes that are different from one another, and that may be oriented at variety of angles relative to one another (e.g., from about 0° to about 90°) and may intersect, or partially or completely overlap one another, for example.

The opto-electrical component 154 may be any opto-electrical component 154, such as an optical-fiber tray, and opto-electrical module, a second optical fiber track system 100, and combinations thereof, for example. The first end 148 of the ramp 106 may comprise a straight portion for a first distance, such as about ½ inch, for example, and the straight portion may lie in a plane parallel to the plane defined by the track 104. Similarly, the second end 150 of the ramp 106 may comprise a straight portion for a second distance, such as ½ inch, for example, and the straight portion may lie in a plane parallel to the plane defined by the track 104, or in a plane angled at an angle from about 0° to about 90° relative to the plane defined by the track 104, for example.

The ramp 106 may further have one or more attachment openings 156 and/or one or more truss (not shown) adapted to allow for the attachment of the ramp 106 to the support 102, for example. Further, the first end 148 of the ramp 106 may be connected to the ramp end 112 of the track 104 in any suitable manner, such that the one or more optical fiber channels 120 is substantially aligned with the one or more channels 152. For example, the track 104 and the ramp 106 may be attached to the support 102 such that the ramp end 112 of the track 104 and the first end 148 of the ramp 106 are connected to, or positioned next to, in close proximity to, or adjacent to, one another.

The second end 150 of the ramp 106 may be attached to the opto-electrical component 154 in any conventional manner, or may be positioned adjacent to the opto-electrical component 154. The opto-electrical component 154 may comprise an optical fiber tray in some exemplary embodiments of the inventive concepts disclosed herein. It is to be understood however, that in some exemplary embodiments the second end 150 of the ramp 106 may be attached to a second support 102.

In some exemplary embodiments, the track 104 may be omitted, and the first end 148 of the ramp 106 may be attached to the support 102 such that the first end 148 of the ramp 106 is connected to, positioned in close proximity with, or adjacent to, the opto-electrical component 138, such that the one or more optical fibers 124 connected to the opto-electrical component 138 may be accommodated by the one or more channels 152.

Figure 8:
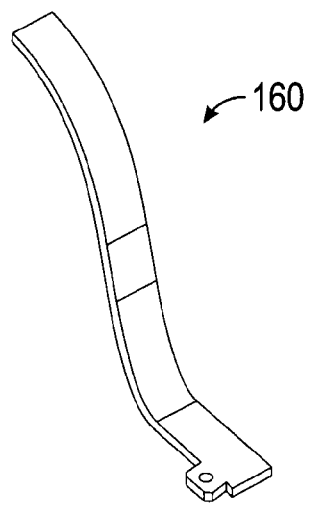
FIG. 8 is a perspective view of a ramp cover according to the inventive concepts disclosed herein for covering the ramp and any optical fibers supported and routed by the ramp.

Referring now to FIG. 8, the ramp 106 may further comprise a ramp cover 160. The ramp cover 160 may be implemented similarly to the track cover 122, and is adapted to substantially completely cover the one or more channels 152, such that the one or more optical fibers 124 is protected along substantially the entire length of the one or more channels 152. Further, a portion (not shown) of the ramp cover 160 may extend past, or overhang, the first end 148 of the ramp 106, to provide additional protection for the one or more optical fibers 124 at the connection between the one or more optical fibers 124 and the opto-electrical component 154. Similarly, a portion of the ramp cover 160 may extend past, or overhang, the second end 150 of the ramp 106 to provide additional protection for the one or more optical fibers 124 at the connection between the one or more optical fibers 124 and the opto-electrical component 136 in some exemplary embodiments.

It is to be understood, however, that in some exemplary embodiments of the inventive concepts disclosed herein, the track 104 and the ramp 106 may be implemented as a unitary optical fiber track system 100, for example. Further, in some exemplary embodiments, the track cover 122 and the ramp cover 160 may be implemented as a unitary track system cover (not shown). It is to be further understood that two or more ramps 106, and two or more tracks 104, and combinations thereof may be implemented in some exemplary embodiments of the inventive concepts disclosed herein.

Further, the track 104 and the ramp 106 may be implemented in addition to, or in combination with, conventional optical fiber routing mechanisms and devices, such as optical fiber clips (not shown), optical fiber trays (not shown), optical fiber posts, and combinations thereof, for example. In addition, the track 104 or the ramp 106 may be omitted in some exemplary embodiments of the inventive concepts disclosed herein.

Further, while the track 104 and the ramp 106 are shown as being at least partially supported at a distance above the support 102 and in a substantially vertical orientation relative to a plane defined by the support 102, the inventive concepts disclosed herein are not limited to this configuration. In some exemplary embodiments, the track 104 may be at least partially supported at a first height above the support 102, which first height may vary from 0 to any height allowing one or more optical, electrical, or opto-electrical components to be positioned between the support 102 and the track 104. In other exemplary embodiments, the ramp 106 may be at least partially supported at a second height above the support 102, which second height may vary from 0 to any height allowing one or more optical, electrical, or opto-electrical components to be positioned between the support 102 and the ramp 106. In some exemplary embodiments the first height and the second height may be different from one another, while in other exemplary embodiments the first height and the second height may be equal of substantially equal to one another. Further, in some exemplary embodiments, the track 104 may be partially or completely positioned above or below the ramp 106 relative to the plane defined by the support 102 or by the track 104.

In yet further embodiments, the track 104 or the ramp 106 may be supported in a plane that is non-coplanar with a plane defined by the support 102, which plane may be oriented at various angles relative to the plane defined by the support 102, which angles may vary from about 0° to about 90°.

It is to be expressly understood that while the ramp 106 is shown and described herein as extending in a plane non-coplanar with the plane defined by the track 104 or by the support 102, in some exemplary embodiments of the inventive concepts the ramp 106 may extend partially or completely below the plane defined by the tack 104 or by the support 102, whether or not the ramp 106 extends through an opening in the support 102. Further, in some exemplary embodiments, the ramp 106 may extend partially or completely in a plane that is coplanar with the plane defined by the track 104 or by the support 102.

It is to also be understood that in some exemplary embodiments, the support 102 may be implemented as any conventional support, such as a printed circuit board, an optical fiber rack, an optical fiber shelf, a computer box, a server box, a switching cabinet, a server rack, and combinations thereof, as will be understood by persons of ordinary skill in the art having the benefit of the instant disclosure.

Figure 9:
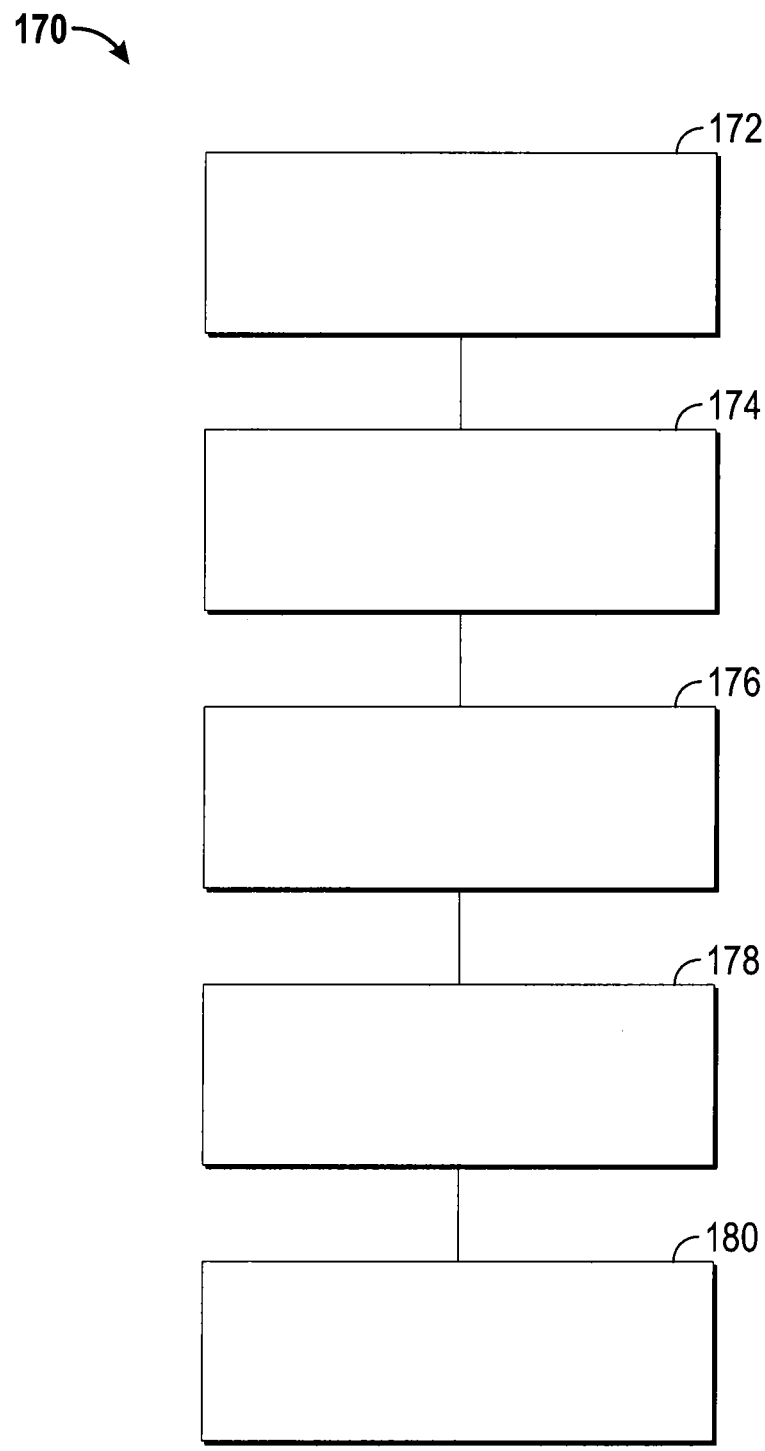
FIG. 9 is a block diagram of an exemplary embodiment of a method for routing an optical fiber according to the inventive concepts disclosed herein.

Referring now to FIG. 9, a method 170 of routing one or more optical fibers 124 according to the inventive concepts disclosed herein comprises accommodating the one or more optical fibers 124 by an optical fiber track system 100 as follows:

In a step 172, the track 104 is attached to the support 102 and supported above one or more electrical components attached to the support 102, such as by using one or more connectors 134 of one or more truss 130, one or more attachment openings 140, or any other suitable attachment mechanism, and combinations thereof, for example. It is to be understood that the track 104 may be supported at any desired distance above the support 102, or may be supported at the surface of the support 102, for example. Further, in some exemplary embodiments, a first portion of the track 104 may be supported at the surface of the support 102, and a second portion of the track 104 may be supported above or below the support 102. In some exemplary embodiments, the track 104 may extend through an opening formed in the support 102, such that a portion of the track 104 is positioned at or above a top surface of the support 102, and a portion of the track 104 is positioned at or below a bottom surface of the support 102, for example.

In a step 174, the ramp 106 is supported above the support 102, such that the first end 148 of the ramp 106 is aligned with, and adjacent to, the ramp end 112 of the track in order to substantially align the one or more optical fiber channels 120 and the one or more channels 152 with one another.

In a step 176, the one or more optical fibers 124 is positioned in and routed through the one or more optical fiber channels 120 and the one or more channels 152 such that the one or more optical fibers 124 is accommodated by the one or more optical fiber channels 120 and the one or more channels 152. The one or more optical fibers 124 may be connected to the opto-electrical component 138 and to the opto-electrical component 154, for example. Any excess length of the one or more optical fibers 124 may be wound up, or looped around, the portion 142 of the track 104. One, two, or more optical fibers 124 may be routed through the optical fiber track system 100 in this manner.

In a step 178, the track cover 122 is attached to the track 104. The track cover 122 may be attached to the track 104 in any conventional manner, such as by being press-fitted, screwed, bolted, clamped, bracketed, riveted, welded, adhered to, or otherwise temporarily or permanently attached to the track 104, and combinations thereof, for example.

In a step 180, the ramp cover 160 is attached to the ramp 106. The ramp cover 160 may be attached to the ramp 106 in a similar manner to attaching the track cover 122 to the track 104, for example.

It is to be understood that the steps disclosed herein may be performed simultaneously or in any desired order, and may be carried out by a human, or by a machine, and combinations thereof, for example. For example, one or more of the steps disclosed herein may be omitted, one or more steps may be further divided in one or more sub-steps, and two or more steps or sub-steps may be combined in a single step, for example. Further, in some exemplary embodiments, one or more steps may be repeated one or more times, whether such repetition is carried out sequentially or interspersed by other steps or sub-steps. Additionally, one or more other steps or sub-steps may be carried out before, after, or between the steps disclosed herein, for example.

Further, in some exemplary embodiments of the inventive concepts disclosed herein, the optical fiber track system 100 may be pre-assembled, such that the one or more optical fibers 124 are accommodated by the optical fiber track system 100 and the track cover 122 and the ramp cover 160 are attached to the track 104 and the ramp 106 respectively, prior to attaching the optical fiber track system 100 to the support 102 and/or to various opto-electrical components.

In some exemplary embodiments of the inventive concepts disclosed herein, the support 102 may be designed with the desired attachments sites for the optical fiber track system 100, while in other exemplary embodiments the track optical fiber track system 100 may be designed such that the optical fiber track system 100 is used to retro-fit the existing attachments sites on an existing support 102, such as by providing one or more truss 130 that is adjustable relative to the track 104, for example. Further, in some exemplary embodiments, the support 102 and the optical fiber track system 100 may be manufactured as a unitary body.

Even though particular combinations of features are recited in the claims and/or disclosed in the specification, these combinations are not intended to limit the disclosure.

In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the inventive concepts disclosed herein unless explicitly described as such outside of the preferred embodiment. Further, the phrase "based on" is intended to mean "based, at least in part, on" unless explicitly stated otherwise.

Any and all references, articles, published applications, and patents cited herein are hereby incorporated herein in their entirety by reference, unless expressly noted otherwise.

What is claimed is:

1. An optical system, comprising:
    a first track having a first end, a second end, and one or more first channels extending from the first end of the first track to the second end of the first track for accommodating first and second optical fibers therein, the first track defining a first plane;
    a second track having a first end, a second end, and one or more second channels extending form the first end of the second track to the second end of the second track for accommodating second and third optical fibers therein, the second track extending along the first plane
    a ramp having a first end, and a second end, defining one or more third channels extending from the first end of the ramp to the second end of the ramp for accommodating the one or more first optical fibers and the one or more second optical fibers therein, the ramp being attachable to a support such that the first end of the ramp is adjacent to the second ends of the first and second tracks, such that the one or more first optical fibers extend from the first track into the third channels of the ramp, and the one or more second optical fibers extend from the second track into the third channels of the ramp; and
    a truss including first and second arms and a connector, which is spaced from the track by the first and second arms, the first and second arms extending from the connector to a portion of the track, such that the track is attached to the support via the connector,
    wherein when the first track and the ramp are attached to the support, the one or more first channels is substantially aligned with the one or more second channels, and the second end of the ramp extends in a second plane.

2. The optical fiber system of claim 1, wherein the first plane and the second plane are non-coplanar.

3. The optical fiber system of claim 1, further comprising a track cover attachable to the first track, such that the track cover substantially covers the one or more first channels.

4. The optical fiber system of claim 3, wherein the track cover further comprises an end extending a first distance past the second end of the first track.

5. The optical fiber system of claim 3, further comprising a ramp cover attachable to the ramp, such that the ramp cover substantially covers the one or more third channels.

6. The optical fiber system of claim 5, wherein the ramp cover further comprises an end extending a second distance past the second end of the ramp.

7. The optical fiber track system of claim 1, wherein the support comprises a printed circuit board.

8. A method, comprising:
    routing one or more first optical fibers and one or more second optical fibers through an optical fiber track system comprising:
    first and second tracks, each having a first end and a second end, the first track including one or more first channels extending from the first end of the first track to the second end of the first track for accommodating the one or more first optical fibers therein, the first track defining a first plane,
    the second track including one or more second channels extending from the first end of the second track to the second end of the second track for accommodating the one or more second optical fibers therein, the second track extending along the first plane;
    a ramp having a first end and a second end, defining one or more third channels extending from the first end of the ramp to the second end of the ramp for accommodating the one or more first optical fibers and the one or more second optical fibers therein, the ramp being attached to the support such that the first end of the ramp is adjacent to the second end of the first track and the second end of the second track the one or more third channels being substantially aligned with the one or more first channels and the one or more second channels, such that the one or more first optical fibers extend from the first track onto the ramp, and the one or more second optical fibers extend from the second track on to the ramp; and
    a truss including first and second arms and a connector, which is spaced from the first track by the first and second arms, the first and second arms extending from the connector to a portion of the first track, such that the first track is attached to the support via the connector,
    wherein the second end of the ramp extends in a second plane.

9. The method of claim 8, further comprising attaching a track cover to the first track, such that the track cover substantially covers the one or more first channels.

10. The method of claim 9, further comprising attaching a ramp cover to the ramp, such that the ramp cover substantially covers the one or more second channels.

11. The method of claim 8, wherein the first plane and the second plane are non-coplanar.

12. A kit, comprising:
    a first track comprising a first end, a second end, defining one or more first channels extending from the first end of the track to the second end of the track for accommodating one or more first optical fibers therein, the first track defining a first plane;
    a second track including one or more second channels extending from the first end of the second track to the second end of the second track for accommodating one or more second optical fibers therein, the second track extending along the first plane;
    a ramp comprising a first end, a second end, defining one or more third channels extending from the first end of the ramp to the second end of the ramp for accommodating the one or more first optical fibers therein and the one or more second optical fibers therein, such that one or more first optical fibers extend from the first track into the one or more third channels of the ramp and the one or more second optical fibers extend from the second track into the one or more third channels of the ramp, the ramp being attachable to the support such that the first end of the ramp is adjacent to the second end of the track, wherein when the track and the ramp are attached to the support, the one or more first channels and the one or more second channels are substantially aligned with the one or more third channels, and the second end of the ramp extends in a second plane;
a track cover attachable to the track, such that the track cover substantially covers the one or more first channels;
a ramp cover attachable to the ramp, such that the ramp cover substantially covers the one or more third channels; and
a truss including first and second arms and a connector, which is spaced from the first track by the first and second arms, the first and second arms extending from the connector to a portion of the first track, such that the first track is attached to the support via the connector.

13. The kit of claim 12, wherein the track cover further comprises an end extending a first distance past the second end of the first track.

14. The kit of claim 12, wherein the ramp cover further comprises an end extending a second distance past the second end of the ramp.

15. An optical fiber system in
accordance with claim 1, further comprising a printed circuit board, the first and second tracks and the ramp being provided on the printed circuit board.

* * * * *